US009950757B2

(12) United States Patent
Tibbits

(10) Patent No.: US 9,950,757 B2
(45) Date of Patent: Apr. 24, 2018

(54) TRACTION CLEAT FOR A TRACKED VEHICLE

(71) Applicant: Tibbits Equipment Services, Inc., Barre, VT (US)

(72) Inventor: Brian D. Tibbits, Jericho, VT (US)

(73) Assignee: TIBBITS EQUIPMENT SERVICES, INC., Barre, VT (US)

( * ) Notice: Subject to any disclaimer, the term of this patent is extended or adjusted under 35 U.S.C. 154(b) by 246 days.

(21) Appl. No.: 14/962,739

(22) Filed: Dec. 8, 2015

(65) Prior Publication Data

US 2017/0158268 A1 Jun. 8, 2017

(51) Int. Cl.
*B62D 55/28* (2006.01)

(52) U.S. Cl.
CPC .......... *B62D 55/286* (2013.01); *B62D 55/28* (2013.01)

(58) Field of Classification Search
CPC ..... B62D 55/28; B60C 27/02; B60C 27/0261; B60C 27/0284; B60C 27/0292; B60C 27/04; B60C 27/045; B60C 27/06; B60C 27/062; B60C 27/065; B60C 27/066; B60C 27/068
See application file for complete search history.

(56) References Cited

U.S. PATENT DOCUMENTS

| 1,258,683 A | 3/1918 | Houghton |
| 2,701,169 A | 2/1955 | Cannon |
| 2,808,094 A * | 10/1957 | Marchionda ............ B60C 27/04 152/225 C |
| 2,954,086 A | 9/1960 | Butman |
| 3,245,451 A * | 4/1966 | Gellman ................. B60C 27/04 152/225 C |
| 3,291,180 A * | 12/1966 | Gellman ................. B60C 27/02 152/255 C |
| 4,813,466 A * | 3/1989 | Forsyth .................... B60C 27/20 152/179 |
| 5,769,511 A * | 6/1998 | Hattori ................. B62D 55/275 305/189 |
| RE36,025 E * | 1/1999 | Suzuki ................. B62D 55/275 305/187 |

(Continued)

FOREIGN PATENT DOCUMENTS

| JP | 3399871 | 8/2000 |
| JP | 2002264855 | 9/2002 |
| JP | 3869833 | 9/2005 |

*Primary Examiner* — Jason R Bellinger
(74) *Attorney, Agent, or Firm* — Shlesinger, Arkwright & Garvey LLP

(57) ABSTRACT

A traction cleat for the track of a tracked vehicle, the cleat has an elongated support member having first and second ends and a central portion extending between the first and second ends, the support member ends are larger in cross-section than the central portion to provide an open region extending between the support member and a track to which it will be attached, a mounting flange extends from each of the support member ends, one of which includes mounting hardware to removably secure the traction cleat to a track, and a series of individual traction members, the traction members are disposed along the length of the support member other than at the central portion thereof so that when the cleat is secured to a track it will expel debris including ice or snow that might otherwise accumulate between the cleat and the track.

20 Claims, 5 Drawing Sheets

(56) References Cited

U.S. PATENT DOCUMENTS

| | | |
|---|---|---|
| 6,557,954 B1 | 5/2003 | Hattori |
| 7,901,015 B1 | 3/2011 | Anderson |
| 8,424,981 B1 | 4/2013 | Stratton, Jr. |
| 8,672,064 B2 | 3/2014 | Korus et al. |
| 2013/0049452 A1 | 2/2013 | Burling |
| 2014/0175865 A1 | 6/2014 | Korus et al. |

* cited by examiner

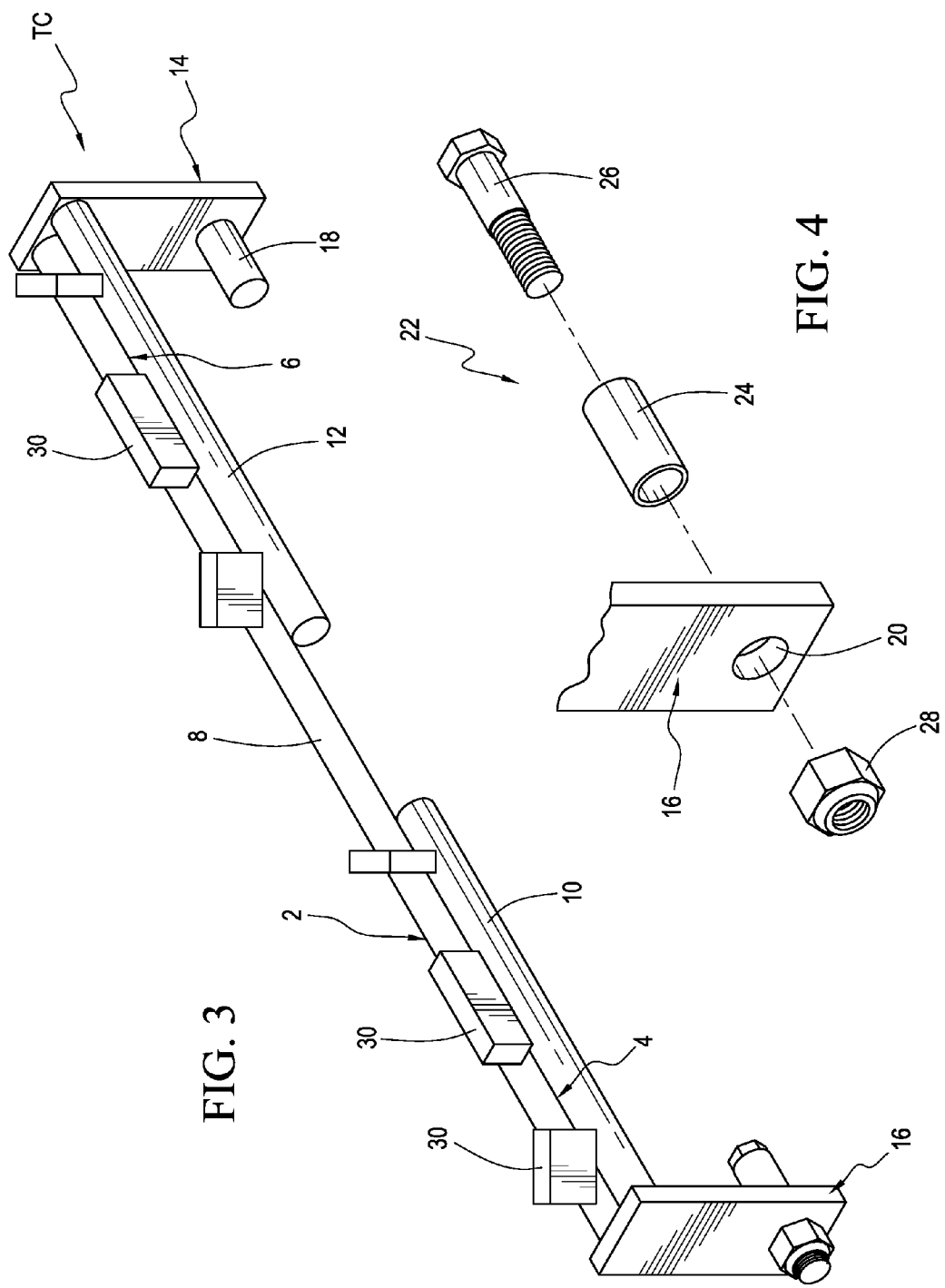

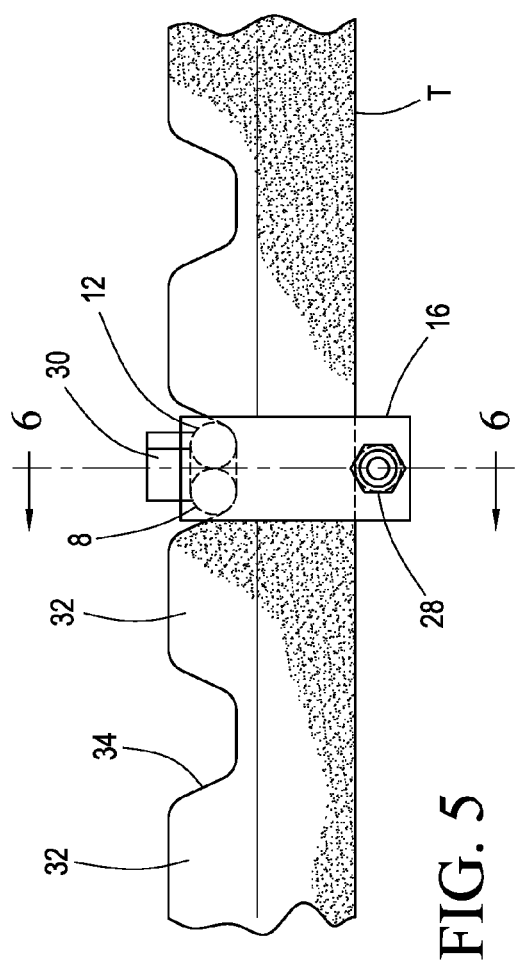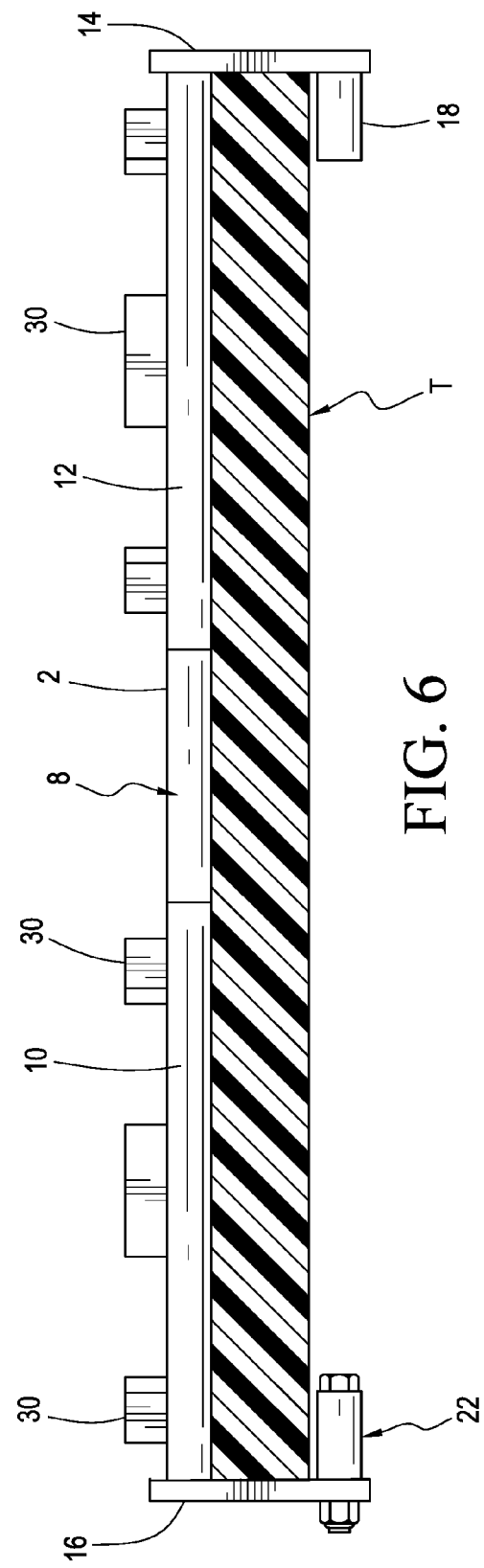

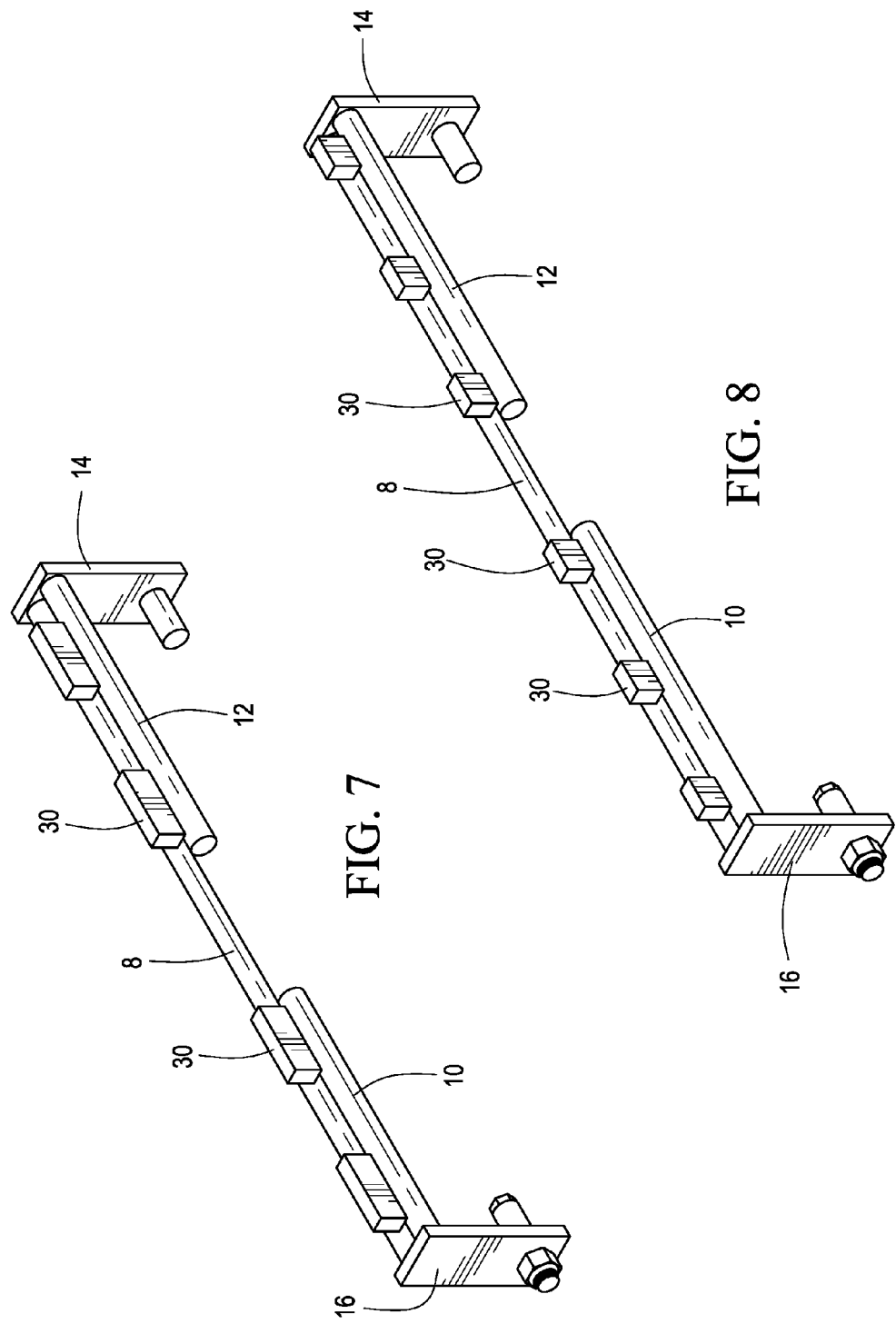

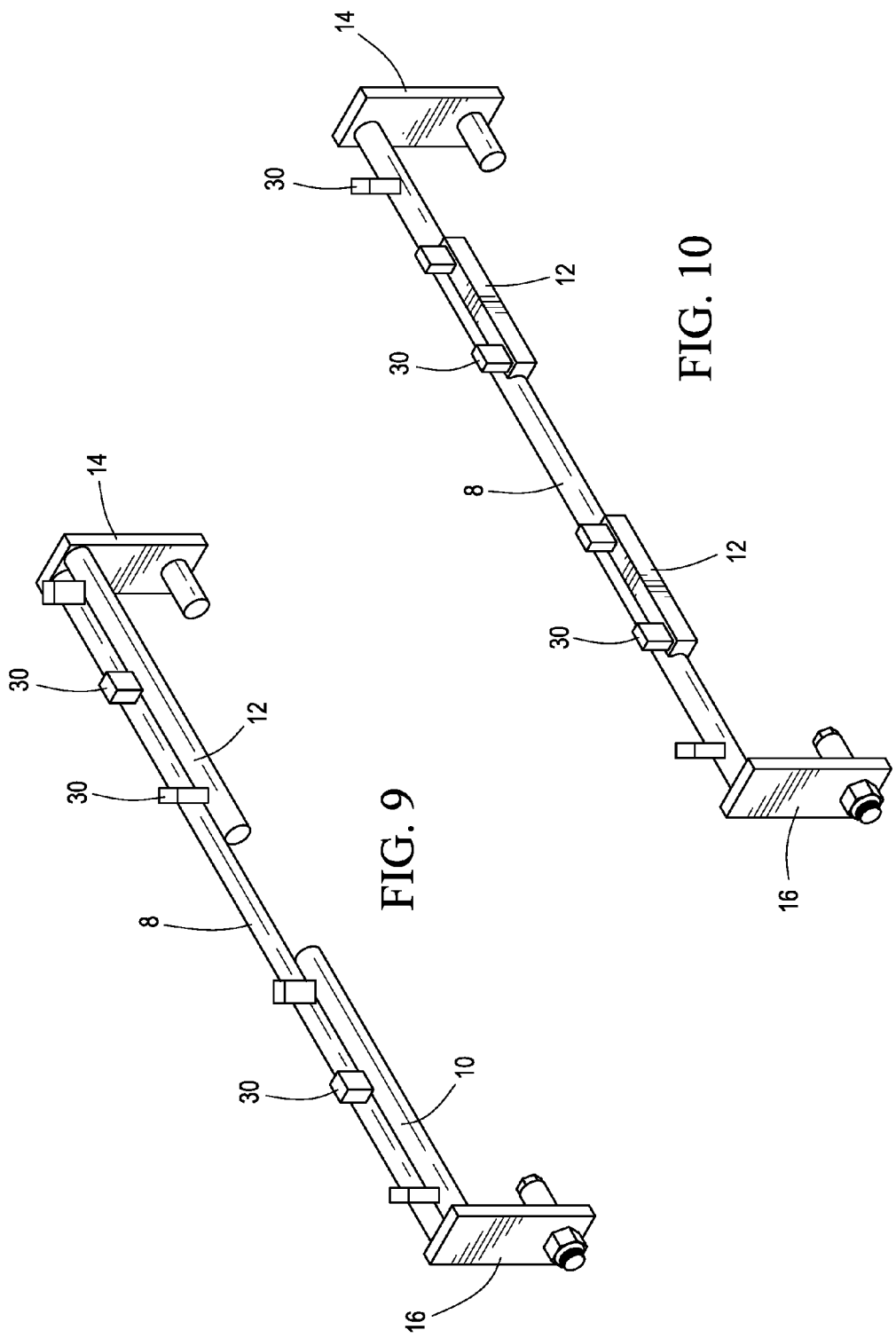

TRACTION CLEAT FOR A TRACKED VEHICLE

FIELD OF THE INVENTION

This invention is a device for attachment to the continuous track of a tracked vehicle including, but not limited to, heavy construction equipment, to improve traction in mud, snow or icy conditions.

BACKGROUND OF THE INVENTION

Continuous tracks are provided on heavy construction equipment to improve weight distribution and enhance traction in off-road conditions. Although continuous tracks may be constructed from metal, rubber continuous tracks are also common.

Under certain conditions, tracked heavy equipment cannot maintain good contact with the ground. For example, on steeper slopes or slopes that are covered in snow and ice, tracks cannot provide adequate grip and skidding of the vehicle may occur. This affects the efficiency and effectiveness of the equipment and may also lead to safety issues, both to the driver and others on the job site.

It is known to insert studs into the exterior surface of a track, particularly a rubber track, to improve its gripping characteristics; however, these efforts provide limited improvement and often cause damage the continuous track. In addition, studded tracks restrict use of the vehicle to the winter months.

It is also known to provide a removable cleat that is temporarily attached to the track to provide supplemental gripping characteristics. Generally speaking, these devices are in the form of a fixed bar that extends the width of the track. Means are provided to secure the bar to the track, typically in the form of chains or hooks that extend from the end of the bar and lock it to the underside of track. These devices are difficult to install and remove and are known to fail during use. Failure is often due to the severe stresses the device is subjected to during use. Further, prior art cleats accumulate snow, ice and debris which reduces the gripping characteristics of the cleat. In addition, debris can damage the cleat and lead to failure.

BRIEF SUMMARY OF THE INVENTION

A traction cleat for the track of a tracked vehicle, the cleat comprising an elongated support member having first and second opposite ends and a central portion extending therebetween, the first and second ends are larger in cross-section than that of the central portion so as to provide an open region that extends between the support member and the track to which it is to be attached, a pair of mounting flanges, a separate one of the mounting flanges extends from each of the support member first and second ends and at least one of which includes mounting hardware to selectively secure the cleat to a track, and a series of individual traction members, the traction members are disposed along the length of the support member other than at the central portion thereof whereby the open region is adapted to expel ice or snow that might otherwise accumulate between the cleat and the track to which it is attached.

BRIEF DESCRIPTION OF THE SEVERAL VIEWS OF THE DRAWINGS

FIG. 3 is perspective view showing one embodiment of the cleat of the present invention;

FIG. 4 is an exploded view of the mounting hardware associated with one of the pair of mounting flanges;

FIG. 5 is an end view of the cleat according to the present invention when secured to a continuous track with portions of the continuous track broken away;

FIG. 6 is cross sectional view of the clamp shown in FIG. 5 taken along lines 6-6;

FIG. 7 is a perspective view of another embodiment of the cleat according to the present invention;

FIG. 8 is a perspective view of another embodiment of the cleat according to the present invention;

FIG. 9 is a perspective view of another embodiment of the cleat according to the present invention; and FIG. 10 is a perspective view of another embodiment of the cleat according to the present invention.

DETAILED DESCRIPTION OF THE INVENTION

Figure 1:
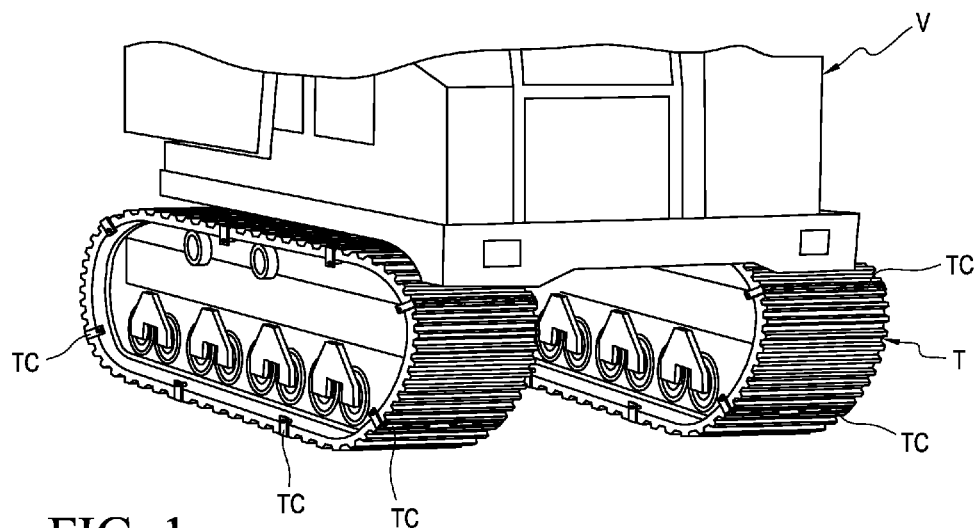
FIG. 1 is a perspective view showing the continuous track of a tracked vehicle with cleats according to the present invention secured to the continuous track and with portions of the vehicle broken away.

FIG. 3 shows the traction cleat TC according to the present invention and FIG. 1 illustrates several traction cleats TC of the present invention secured to the continuous tracks T of a heavy equipment vehicle V. As is apparent, the number and spacing of the traction cleats TC on a continuous track may vary. Additional or fewer traction cleats may be used depending upon, for example, the amount of snow or ice cover or the slope of the terrain.

Figure 2:
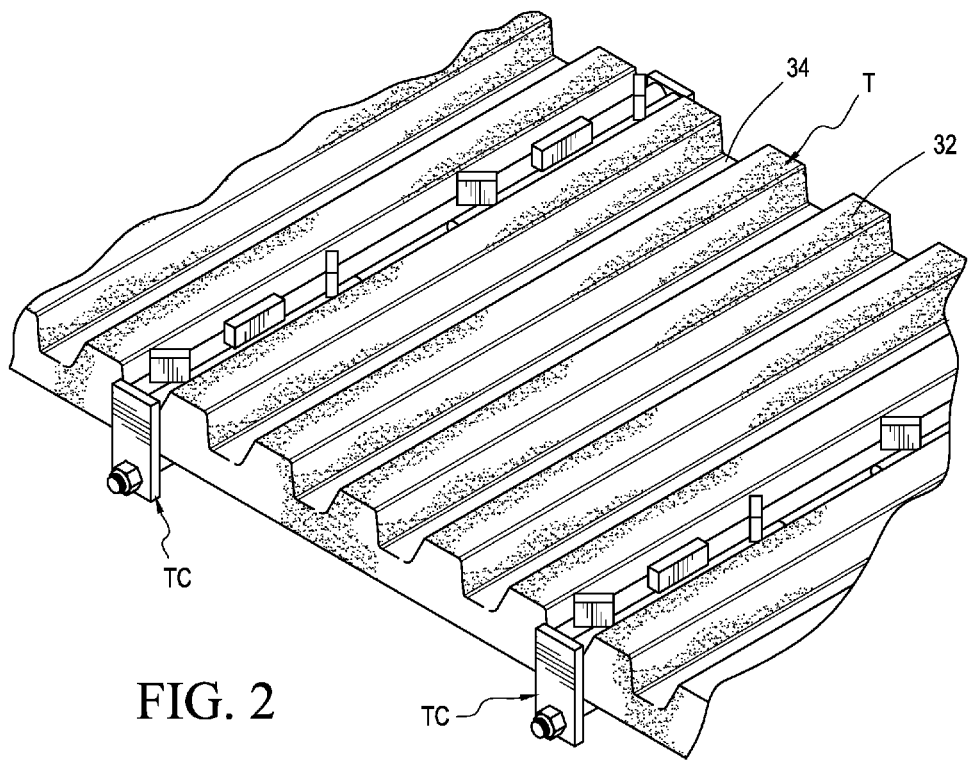
FIG. 2 is perspective view showing the cleat of the present invention secured to a continuous track with portions of the continuous track broken away.

The traction cleat TC in FIG. 3 is shown to generally comprise an elongated support member or cross bar 2 that extends the width of a track it will be secured (FIG. 2). The support member 2 is shown to be a round bar having end portions 4, 6 and a central portion 8. The end portions 4, 6 preferably have an overall thickness that is greater than or otherwise larger in cross-section than that of central portion 8. In the embodiment shown in FIG. 3, the variation is thickness between the end portions 4, 6 and the central portion 8 is due to the rounded reinforcing bars 10, 12 provided at opposite ends of the support member 2. The length and thickness of the reinforcing bars will depend upon the track width and tread design. The reinforcing bars assist in keeping the cleat from tilting excessively when it is in contact with the ground. It also functions to reduce tension and stress on the mounting flanges. The central portion 8 of the support member 2 is shown to be disposed between the reinforcing bars 10, 12 and functions as a clean-out region that self-evacuates debris, such as rocks or other material, and prevents material from collecting around the cleat. Collection of debris can generate excessive stress on the cleat and lead to failure.

Providing the support member 2 and the end portions 4, 6 with the rounded exterior surface shown in FIG. 3 enable the traction cleat TC to slightly oscillate as the track moves. This prevents abrasion of a rubber track by the cleat. As is apparent, it is within the scope of the present invention to use other shapes for the support member depending upon the size and shape of the track as will be further explained below.

For example, the support bar may be in the form of a single bar without exterior rounded reinforcing bars 10, 12. In this variation the support member would be cylindrical in cross-section throughout from one end to the other but also be provided with a larger diameter at the end portions relative to the central portion for reinforcement purposes. The larger diameter end portions replace the need for securing separate reinforcing bars 10, 12 to the support member or cross bar 2.

As noted earlier, a support member 2 that is not provided with a rounded exterior surface is within the scope of the present invention. For example, the cross-section of the support member 2 may have a shape and width that substantially matches the shape and width of the trough region 34 of the track, e.g. a trapezoid. Other variations are within the scope of the present invention.

The support member and reinforcing bars are preferably solid throughout and constructed from cold rolled steel. It is preferable to use cold rolled steel because it has a tensile strength sufficient to allow the support member 2 to slightly bend during use as the cleat is subjected to weight and pressure but will also allow it to return to its original shape following use. Other metal materials are within the scope of the present invention depending upon the nature of use of the device and the size and shape of the tread and the vehicle.

Turning to FIG. 3, a pair of mounting flanges or bracket clamps 14, 16 are shown to be provided at the ends of the support member 2 and are generally L-shaped and extend inwardly of the cleat. One of the clamps will be disposed interior of the continuous track to which it will be secured while the other is disposed exterior of the track. The clamps 14 generally extend transverse to the longitudinal axis of the support member 2 and in the embodiment shown, have a length that extends beyond the thickness of the continuous track. This is best shown in FIG. 6.

The interior mounting flange 14 is shown to include a fixed post member 18 that extends inwardly of the cleat and generally parallel to the longitudinal axis of the cleat. The fixed post member 18 is preferably short enough so that when the clamp is subjected to excessively harsh conditions, it will detach without causing damage to the continuous track.

The exterior mounting flange 16 has a shape and dimension similar to that of the exterior mounting flange but includes an aperture 20 for receiving mounting assembly 22. This is best shown in FIG. 4 and is seen to comprise a spacer 24, bolt 26 and cooperating nut 28. As is apparent, the mounting assembly 22 has a length and overall dimension similar to that of the fixed post member 18 of mounting flange 14.

The mounting assembly as set forth above enables the cleat to be installed using conventional tools and be easily installed or removed at a job site or on short notice. In a preferred embodiment, the spacer 24 has a 1 1/16" outside diameter, a 5/8" inside diameter and a 1/4" wall thickness. The bolt 26 is a grade 8 5/8" hex bolt and the nut 28 is a 5/8" Nylock USS11. As is apparent, other mounting means are within the scope of the present invention so long as it enables the cleat to be readily attached to the continuous tread and it is adapted to withstand the mechanical stresses applied to it during use.

Turning to FIG. 3, a series of traction members or bars 30 are shown to be provided along the surface of the elongated support member 2. The number and alignment of the traction bars 30 is specific to the track design to which it will be attached and its application of use. In a preferred embodiment, the traction bars will have a square or rectangular shape as illustrated in the drawings and be constructed from grouser bar material due to its hardness and wear characteristics. Other shapes are within the scope of the invention. The support members are seen to be generally disposed along the portions of the support member 2 that include the reinforced end portions 4 and 6 or reinforcing bars 10, 12 and are not provided at the central portion 8 of the support member 2.

An alignment indicator (not shown) may be provided on the cleat to indicate which one of the two continuous tracks of the vehicle it is adapted to be secured to. The interior mounting flange having the fixed post member is adapted to be secured to the side of the continuous track that is interior of the vehicle whereas the mounting flange 16 having the removable mounting assembly is adapted to be secured to the side of the track that is exterior of the vehicle. The alignment indicator may take the form of a single weld spot provided on cleats that will be secured to the right continuous track of the vehicle whereas a double weld spot may be provided on a cleat adapted to be secured to the left continuous track of a vehicle. As is apparent, other indicator means such as coloration are within the scope of the present invention.

Turning to FIGS. 5 and 6, the cleat is shown attached to a continuous track T. The cleat is disposed within the trough 34 or valley portion of a track T lying between adjacent lug portions 32. The interior mounting flange 14 having the fixed post member 18 is first secured around the interior side of the track after which the opposite mounting flange without its mounting assembly is slid over the opposite side of the track. The mounting assembly is then secured into place by tightening the nut to the bolt.

During use, the rounded support member 2 permits the cleat to slightly rotate or oscillate within the trough 34 of the track. This movement allows any debris that might otherwise accumulate against the cleat during use to be expelled through the central portion.

As noted earlier, the shape, number, angle and alignment of the traction bars 30 may vary to adapt the cleat to specific conditions or uses. This is best illustrated in FIGS. 7, 8 and 9 which shows traction bars aligned along a common axis or each having the same dimension and shape. For example, angled traction bars (FIGS. 3 and 9) provide better grip than parallel traction bars (FIGS. 7 and 9) on a side hill.

FIG. 10 illustrates an embodiment where the reinforcing bars 10, 12 do not fully extend from the mounting flanges 14, 16.

While this invention has been described as having a preferred design, it is understood that it is capable of further modifications, uses and adaptations, both in whole and in part, while following the general principle of the invention and including such departures from the present disclosure as is known or customary practice in the art to which this invention pertains, and as may be applied to the central features of this invention.

I claim:

1. A traction cleat for a continuous track of a tracked vehicle, the cleat comprising:
    a) an elongated support member having first and second opposite ends and a central portion extending therebetween, the first and second ends are larger in cross-section than that of the central portion to provide an open region that extends between the support member and the continuous track to which the elongated support member is attached;
    b) a pair of mounting flanges, a separate one of the mounting flanges extends from each of the support member first and second ends and at least one of the pair of mounting flanges includes mounting hardware to secure the cleat to the continuous track; and
    c) a series of individual traction members, the traction members are provided along the length of the support member other than at the central portion thereof whereby an open region is adapted to expel ice or snow that might otherwise accumulate between the cleat and the track to which the elongated support member is attached.

2. A traction cleat as in claim 1 and further comprising:
a) a pair of reinforcing bars, a separate one of the pair of reinforcing bars is secured to each of the first and second ends.

3. A traction cleat as in claim 2 and wherein the elongated support member and the pair of reinforcing bars are cylindrical.

4. A traction cleat as in claim 1 and wherein each one of the pair of mounting flanges is a plate member that extends transverse to the longitudinal axis of the support member, one of the pair of mounting flanges including a fixed post member extending in a direction toward the other of the pair of mounting flanges, the other of the pair of mounting flanges includes the mounting hardware, the mounting hardware extends in a direction toward the fixed post member and lies along a common axis thereof.

5. A traction cleat as in claim 4 and wherein the mounting hardware comprising a removable post member.

6. A traction cleat as in claim 5 and wherein the mounting hardware comprises a nut and bolt assembly.

7. A traction cleat as in claim 2 and wherein the pair of reinforcing bars are secured to the support member in a side by side manner.

8. A traction cleat as in claim 1 and wherein at least one of the traction members is aligned at an angle with respect to the other traction members.

9. A traction cleat as in claim 1 and wherein at least one of the traction members is aligned along the same longitudinal axis of the other traction members.

10. A traction cleat as in claim 1 and wherein the individual traction members have a shape that is at least one of square and rectangular.

11. A traction cleat for a track of a tracked vehicle, the cleat comprising:
a) an elongated support member having first and second ends and a central portion therebetween, the first and second ends are wider than the central portion to provide an open region therebetween;
b) a fixed mounting flange, the fixed mounting flange is secured to the first end of the support member;
c) a detachable mounting flange, the detachable mounting flange is secured to the second end of the support member; and
d) at least one traction member, the at least one traction member is provided on the support member and in a region other than at the central portion thereof whereby when the device is secured to the track of a tracked vehicle an open region is adapted to expel any debris that might otherwise accumulate between the cleat and the track during use.

12. A traction cleat as in claim 11 and further comprising:
a) a pair of reinforcing bars, a separate one of the pair of reinforcing bars is secured to each of the first and second ends.

13. A traction cleat as in claim 12 and wherein the elongated support member and the pair of reinforcing bars are cylindrical.

14. A traction cleat as in claim 11 and wherein the fixed mounting flange is a plate member that extends transverse to the longitudinal axis of the support member and includes a post member that extends in a direction toward the detachable mounting flange, the detachable mounting flanges includes mounting hardware that extends in a direction toward the fixed post member and lies along a common axis therewith.

15. A traction cleat as in claim 14 and wherein the mounting hardware includes a nut and bolt assembly.

16. A traction cleat as in claim 12 and wherein the reinforcing bars are secured to the support member in a side by side manner to provide a joint surface to which the at least one traction member may be disposed.

17. A traction cleat as in claim 11 and further comprising additional traction members provided on the support member.

18. A traction cleat as in claim 17 and wherein at least one of the traction members is aligned along the same longitudinal axis of the other traction members.

19. A traction cleat as in claim 17 and wherein at least one of the traction members is aligned at an angle with respect to the other traction members.

20. A traction cleat as in claim 17 and wherein the traction members have at least one of a square or rectangular shape.

* * * * *